(12) United States Patent
Ferguson (10) Patent No.: US 8,185,334 B2
(45) Date of Patent: May 22, 2012

(54) METHODS AND SYSTEMS FOR FILTERING A DIGITAL SIGNAL

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 515 days.

(21) Appl. No.: 12/398,714

(22) Filed: Mar. 5, 2009

(65) Prior Publication Data

US 2010/0225818 A1  Sep. 9, 2010

(51) Int. Cl.
*G01R 13/02* (2006.01)
*G01R 13/08* (2006.01)
*G01R 17/02* (2006.01)
*G01R 17/20* (2006.01)

(52) U.S. Cl. .................. 702/69; 702/67; 702/70; 702/74

(58) Field of Classification Search .................. 702/19, 702/51, 69, 70, 85, 104, 113, 116, 190, 191; 330/254; 348/525; 375/261; 708/313
See application file for complete search history.

(56) References Cited

U.S. PATENT DOCUMENTS

| | | | | |
|---|---|---|---|---|
| 5,621,675 | A * | 4/1997 | Linz et al. .................. | 708/313 |
| 5,995,157 | A * | 11/1999 | Retter et al. .................. | 348/525 |
| 6,525,609 | B1 * | 2/2003 | Behzad .................. | 330/254 |
| 6,628,842 | B1 | 9/2003 | Nagao | |
| 7,920,758 | B2 * | 4/2011 | Ferguson .................. | 382/281 |
| 2004/0175054 | A1 | 9/2004 | Ogata et al. | |
| 2004/0190641 | A1 * | 9/2004 | Ojard .................. | 375/261 |

FOREIGN PATENT DOCUMENTS

EP  1 959 390 A1  8/2008

OTHER PUBLICATIONS

Tarik Arici et al: "Image Local Contrast Enhancement using Adaptive Non-Linear Filters", Image Processing, 2006 IEEE International Conference on, IEEE, PI, Oct. 1, 2006, pp. 2881-2884, XP031049278, ISBN: 978-1-4244-0480-3.

* cited by examiner

*Primary Examiner* — Michael Nghiem
*Assistant Examiner* — Felix Suarez
(74) *Attorney, Agent, or Firm* — Kristine E. Matthews; Michael A. Nelson (57) ABSTRACT

Aspects of the present invention are related to systems and methods for removing spikes and/or speckle noise from a digital signal. In some embodiments of the present invention, an input signal is filtered according to a first low pass filter. The low pass filtered signal, also considered a first local-mean signal, is subtracted from the input signal, thereby producing an AC signal. A maximum of a first region associated with the AC signal and a maximum of a second region associated with the AC signal are determined. When the maximum of the first region and the maximum of the second region meet a comparison criterion, coefficients for a second low pass filter are determined. The input signal is filtered according to the second low pass filter, thereby producing a second local-mean signal, and a second AC signal is produced by subtracting, from the input signal, the second local-mean signal.

21 Claims, 12 Drawing Sheets

METHODS AND SYSTEMS FOR FILTERING A DIGITAL SIGNAL

FIELD OF THE INVENTION

Embodiments of the present invention relate, in general, to methods and systems for filtering digital signals, and more particularly, to methods and systems for removing spikes and/or speckle noise from a digital signal.

BACKGROUND

Many signal processing applications, for example, applications in video, audio, telecommunications and other areas, may require filtering of a digital signal to remove a dominant signal spike and/or speckle-type noise. Video alignment between a test image and a reference image for video-quality measurements is an exemplary field of practice wherein such errors may be encountered. Such errors also may be found in transmitted signals with bursty noise interference, speckle block errors due to compressed-video transmission errors and other areas known in the art. Filtering methods and systems that remove abrupt and/or intermittent errors without, or with reduced, distortion of the surrounding and/or superimposed desired signal may be desirable.

SUMMARY

Some embodiments of the present invention comprise methods and systems for suppressing a spike and/or speckle-type noise in a digital signal. In some embodiments of the present invention, an input signal may be filtered according to a first low pass filter. The low-pass-filtered signal, also considered the local-mean signal, may be subtracted from the input signal, thereby producing an AC signal. A maximum of a first region associated with the AC signal and a maximum of a second region associated with the AC signal may be determined. The first region may be associated with an undesirable signal characteristic. When the maximum of the first region and the maximum of the second region meet a comparison criterion, coefficients for a second low pass filter may be determined. The coefficients may be determined such that the second low pass filter may pass, with minimal attenuation, the undesirable signal characteristic. The input signal may be filtered according to the second low pass filter, thereby producing a second local-mean signal, and a second AC signal may be produced by subtracting, from the input signal, the second local-mean signal.

Some embodiments of the present invention comprise methods and systems for aligning a reference image and a test image. In some embodiments of the present invention, both a reference image and a test image may be filtered according to embodiments of the present invention to suppress a spike and/or speckle-type noise. An input reference signal may be filtered according to a first reference low pass filter. The low-pass-filtered reference signal, also considered the local-mean reference signal, may be subtracted from the input reference signal, thereby producing a first AC reference signal. A maximum of a first region associated with the first AC reference signal and a maximum of a second region associated with the first AC reference signal may be determined. The first region may be associated with an undesirable signal characteristic. When the maximum of the first region and the maximum of the second region meet a reference comparison criterion, coefficients for a second reference low pass filter may be determined. The coefficients may be determined such that the second reference low pass filter may pass, with minimal attenuation, the undesirable signal characteristic. The input reference signal may be filtered according to the second reference low pass filter, thereby producing a second local-mean reference signal, and a second AC reference signal may be produced by subtracting, from the input reference signal, the second local-mean reference signal. An input test signal may be filtered according to a first test low pass filter. The low-pass-filtered test signal, also considered the local-mean test signal, may be subtracted from the input test signal, thereby producing a first AC test signal. A maximum of a first region associated with the first AC test signal and a maximum of a second region associated with the first AC test signal may be determined. The first region may be associated with an undesirable signal characteristic. When the maximum of the first region and the maximum of the second region meet a test comparison criterion, coefficients for a second test low pass filter may be determined. The coefficients may be determined such that the second test low pass filter may pass, with minimal attenuation, the undesirable signal characteristic. The input test signal may be filtered according to the second test low pass filter, thereby producing a second local-mean test signal, and a second AC test signal may be produced by subtracting, from the input test signal, the second local-mean test signal. Alignment may be performed between the first AC reference signal and the first AC test signal when the test comparison criterion is not met and the reference comparison criterion is not met. Alignment may be performed between the first AC reference signal and the second AC test signal when the test comparison criterion is met and the reference comparison criterion is not met. Alignment may be performed between the second AC reference signal and the first AC test signal when the test comparison criterion is not met and the reference comparison criterion is met. Alignment may be performed between the second AC reference signal and the second AC test signal when the test comparison criterion is met and the reference comparison criterion is met.

The foregoing and other objectives, features, and advantages of the invention will be more readily understood upon consideration of the following detailed description of the invention taken in conjunction with the accompanying drawings.

DETAILED DESCRIPTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of embodiments of the invention.

Embodiments of the present invention may be implemented within a test and measurement instrument. For example, embodiments of the present invention may be implemented in a video test instrument, such as a picture quality analyzer. Picture quality analyzers such as the TEKTRONIX® PQA500 may incorporate embodiments of the present invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Many signal processing applications, for example, applications in video, audio, telecommunications and other areas, may require filtering of a digital signal to remove a dominant signal spike and/or speckle-type noise. Filtering methods and systems that remove such abrupt and/or intermittent errors without, or with reduced, distortion of the surrounding and/or superimposed desired signal may be desirable.

Embodiments of the present invention may be used to process signals originating from video equipment. These video signals might be produced by playback equipment, such as DVD players, set-top boxes or production equipment used by broadcasters, or other content providers, prior to transmission of content to end-users.

Some embodiments of the present invention comprise an adaptive feature that may allow for robust measurements and/or other signal processing in the presence of intermittent and/or abrupt errors. Video alignment between a test image and a reference image for video-quality measurements is an exemplary field of practice wherein such errors may be encountered. Such errors also may be found in transmitted signals with bursty noise interference, speckle block errors due to compressed-video transmission errors and other areas known in the art.

Some embodiments of the present invention may be described in relation to an exemplary scenario wherein an acquired test image may be spatially aligned to a reference image in a video sequence. Spatial alignment may be performed according to methods and systems developed by Kevin M. Ferguson, the present inventor, and described in U.S. patent application Ser. No. 11/944,050, now U.S. Pat. No. 7,920,758, issued Apr. 5, 2011, hereinafter the '050 application, entitled "Measurement Apparatus and Method of Measurement of Video Spatial Scale, Offset and Cropping," filed on Nov. 21, 2007, and which is hereby incorporated herein by reference in its entirety. The '050 application claims the benefit of U.S. Provisional Patent Application Ser. No. 60/867,087, filed on Nov. 22, 2006, and which is hereby incorporated herein by reference in its entirety.

Some embodiments of the invention described in the '050 application may use a linear Hough transform of an image of continuously local test and reference cross-correlation to measure spatial distortion parameters, for example, horizontal scale, vertical scale, offset, or shift, missing picture portions near edges, or "cropping," and other spatial distortion parameters, relative to a reference image, from an acquired test image subject to linear and non-linear distortions. Exemplary linear and non-linear distortions may include digital compression and analog transmission artifacts and other distortions.

With letterbox and side-panel options for conversion between 4×3 Standard Definition (SD) video and 16×9 High Definition (HD) video, as well as other processing considerations within resolution and/or format, large portions of an original video frame, also considered the original image, may be missing in a processed video frame, also considered the processed image. For example, the top, left, right and/or bottom of the processed image may have consecutive portions missing. The methods and systems disclosed in the '050 application may be robust in cases where a missing portion may be replaced by blanking, constant border or other known signals, or if the width and/or height may be reduced, for example, totally deleted. However, in practice, other signals, or picture segments, may sometimes be inserted in what is an otherwise blank area of the missing portions. In these situations, the methods and systems disclosed in the '050 application may include these portions as portions of the image for comparison. Effectively, the problem becomes not just an alignment of images problem, but an alignment of an image to a picture-in-picture type of problem. Since the changes across the image may be what is being aligned, very abrupt edges may appear to be very large changes that may dominate any alignment algorithm, not just the methods and systems of the '050 application.

Embodiments of the present invention may be described herein in relation to registration and alignment measurements, but may also be applied to temporal registration and other applications wherein matching, mapping, correlation, identification, searching and other similarity finding methods may be required over parameters of shift (for example, delay, anticipation, translation and other shift parameters) and scale (for example, sample rate, gain, multiplier and other scale parameters). Additionally, embodiments of the present invention may be used in applications wherein rotation, transforms and other manipulations may have occurred between a reference and a test signal or data.

With the proliferation of video formats and devices, changes in image size, registration (for example, spatial shifts up or down, left or right) and cropping (for example, loss of image data near the image borders) may occur more frequently. Video reformatting for repurposing may be becoming more common. One example may be sending a 720 sample per line 601 SD video signal as a 704 ATSC (Advanced Television Systems Committee) digital broadcast signal. Another example may be conversion of 720 SD video to 1920 HD video. While yet another example may be conversion of HD video to QCIF (Quarter Common Intermediate Format) video for mobile phone or PDA (Personal Digital Assistant ) video consumption. Reformatting may require that images fit into a new aspect ratio, width:height, which may require either truncation of image content on the sides or adding "blank" border image segments on the sides, referred to as side panels, and likewise the same on the top and bottom, for example, as in letterbox format.

Reformatting may present problems for equipment manufacturers, broadcasters, editors and other video professionals because processing equipment may be set in incorrect modes, may malfunction, standards may differ and other reasons. Automatic measurement of spatial distortion, for example, horizontal scale, vertical scale, offset, or shift, and missing picture portions near edges, or "cropping," and other spatial distortions, of video output may be desirable.

Additionally, spatial alignment may be required for making automated picture-quality measurements between a test and reference sequence pair, also considered full-reference measurements. Previously this may have been performed using a proprietary stripe place over the original video image. This may be intrusive and may require that test and reference video both have the stripe, thus requiring that the stripe be added prior to video compression and/or other processing required for transmission, storage and other operations. This may be a limitation for automated picture-quality measurement applications because in some applications it may not be practical or possible to add the stripe once the need for measurement arises.

An automated method to measure spatial distortion for both automated video measurement (VM) applications, for example, consumer electronics video output verification, and for automated spatial alignment as required by automatic picture quality (PQ) measurements. In particular, it may be desirable to have one method of measurement that is robust in the presence of digital compression artifacts, random noise, quantization error and other non-linear and linear distortions and interference. It may be desirable for this method to be adaptive in order to work without a priori knowledge of the video content, aspect ratio selected, DUT (Device Under Test) pixel clock, or other indications of the general likely horizontal or vertical scaling, offset (shift) or cropping.

It may, additionally, be desirable that a method be both accurate and computationally efficient.

Aspects of the present invention are related to data signal filtering for spike and/or speckle-type noise removal. Embodiments of the present invention may be used in a variety of applications, for example, those described above. In particular, embodiments of the present invention may be used in conjunction with methods and systems for spatially aligning a test image with a reference image.

Figure 1:
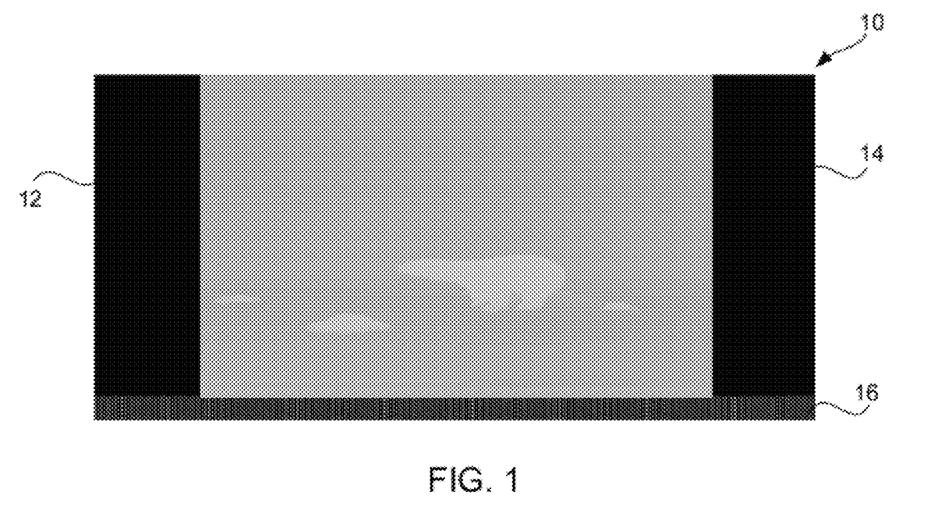
FIG. 1 is a picture depicting an exemplary reference image.
Figure 2:
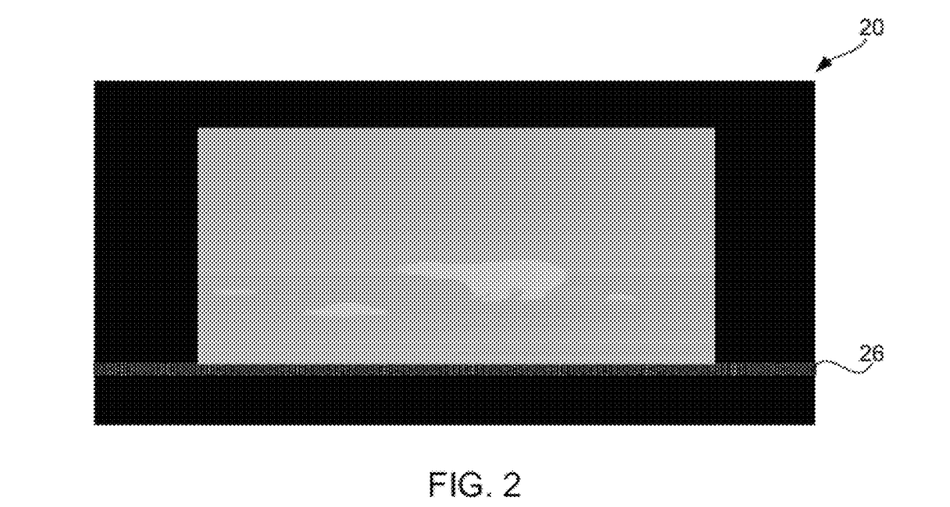
FIG. 2 is a picture depicting an exemplary test image comprising a scale and offset relative to the exemplary reference image shown in FIG. 1.
Figure 3:
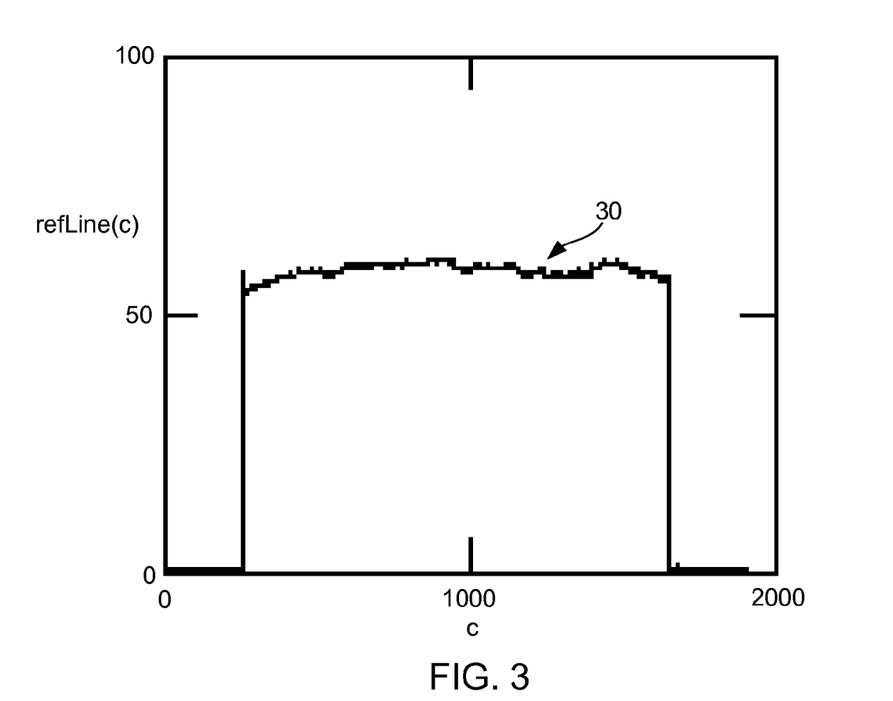
FIG. 3 is a plot of an exemplary average image column line associated with a reference image.
Figure 4:
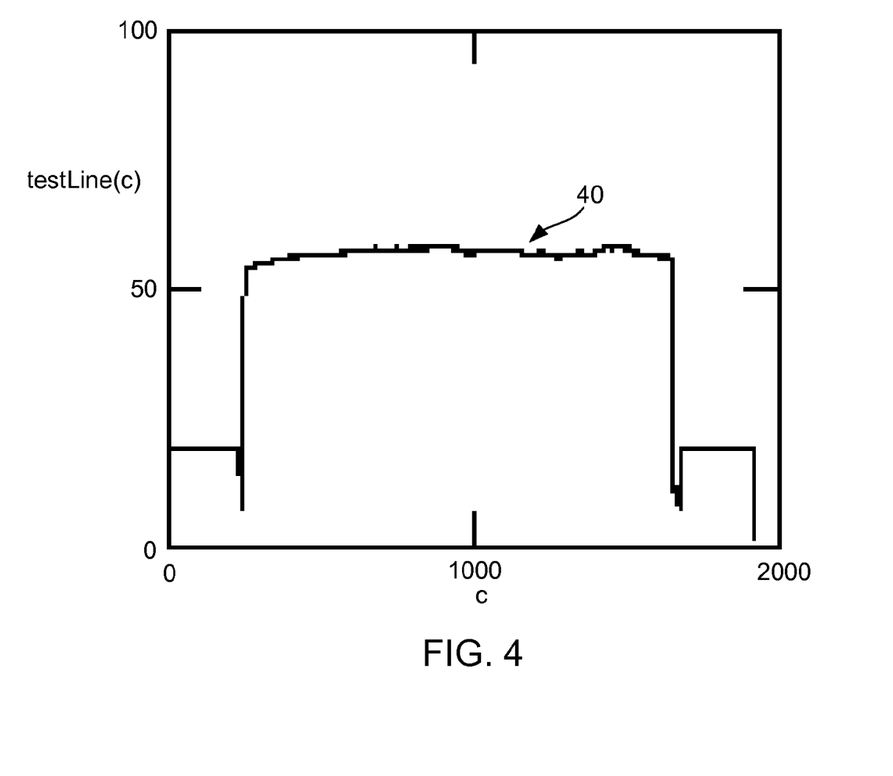
FIG. 4 is a plot of an exemplary average image column line associated with a test image.

Embodiments of the present invention may be understood in relation to FIG. 1 and FIG. 2. FIG. 1 depicts an exemplary reference image 10 comprising a left border region 12 and a right border region 14, each of which would be entirely blank if not for the portion 16 of non-constant image content at the bottom of the exemplary reference image 10. FIG. 2 depicts an exemplary test image 20 with both scale and offset relative to the reference image 10 of FIG. 1. FIG. 3 and FIG. 4, respectively, depict exemplary resulting signals 30, 40 when a reference image, for example, the reference image of FIG. 1 10, and a test image, for example, the test image of FIG. 2 20, are each reduced to an average image column line according to the '050 application by:

$$refLine(c) = \frac{1}{rowsTotalRef} \sum_{r=0}^{rowsTotalRef-1} refY(r, c)$$

and $$testLine(c) = \frac{1}{rowsTotalTest} \sum_{r=0}^{rowsTotalTest-1} testY(r, c),$$

respectively, where rowsTotalRef and rowsTotalTest may be the number of rows in the reference image and the test image, respectively, and refY(r, c) may denote the value of the reference image at row r and column c, and testY(r,c) may denote the value of the test image at row r and column c. The average image column line may comprise a one-dimensional summary signal associated with a two-dimension image signal.

Figure 5:
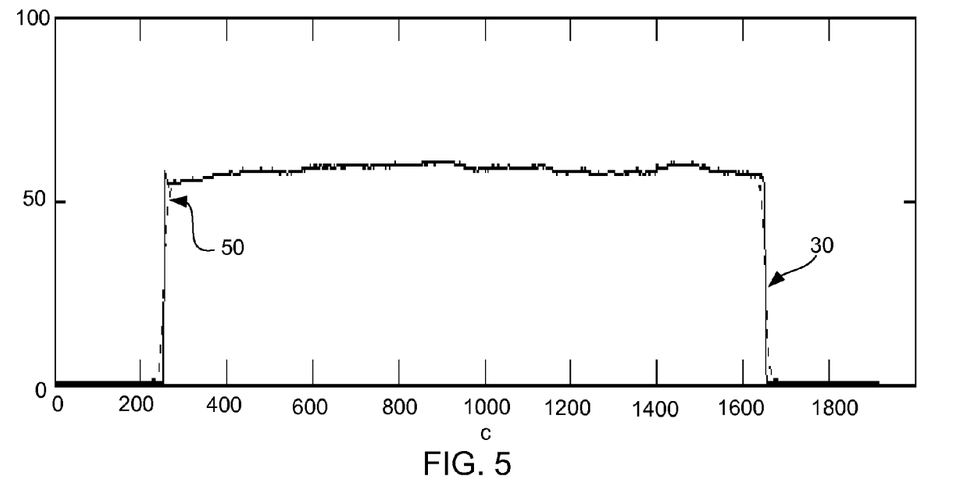
FIG. 5 is a plot of the exemplary average image column line shown in FIG. 3 and a low-pass-filtered version of the exemplary average image column line shown in FIG. 3.
Figure 6:
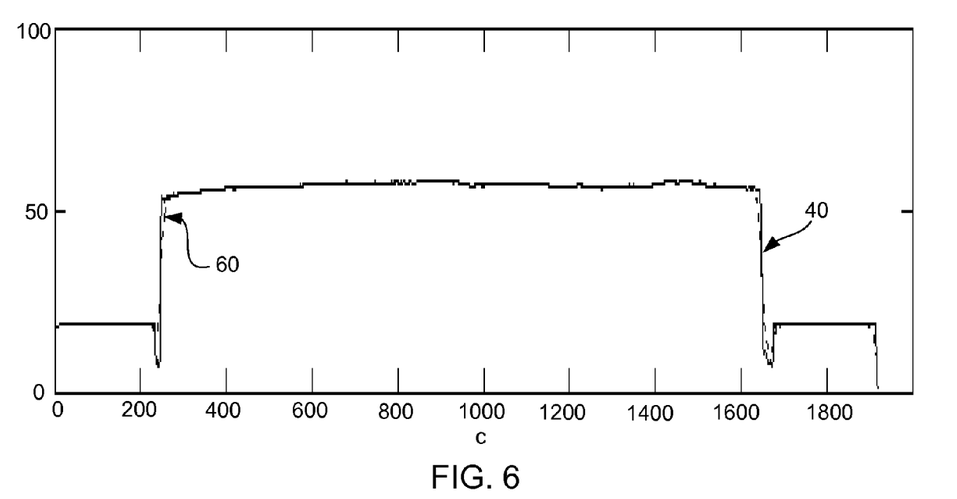
FIG. 6 is a plot of the exemplary average image column line shown in FIG. 4 and a low-pass-filtered version of the exemplary average image column line shown in FIG. 4.
Figure 7:
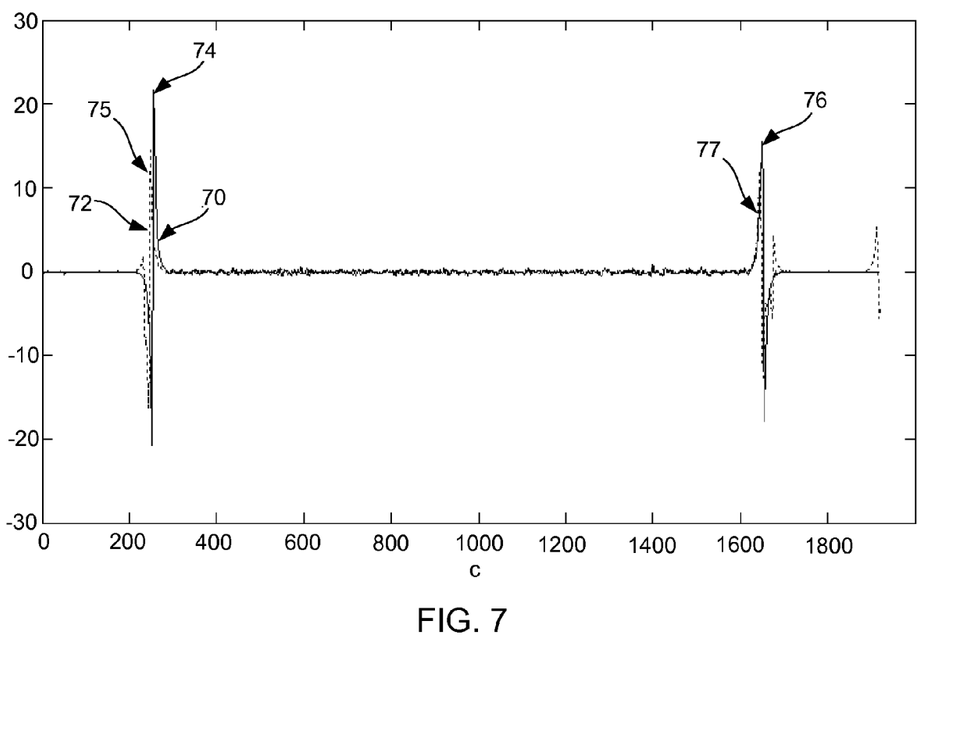
FIG. 7 is a plot of the AC images associated with the exemplary reference and test average image column lines shown in FIG. 3 and in FIG. 4.

FIG. 5 depicts the reference-image average image column line (solid) 30 and a low-pass-filtered version (dashed) 50 of the reference-image average image column line 30, and FIG. 6 depicts the test-image average image column line (solid) 40 and a low-pass-filtered version (dashed) 60 of the test-image average image column line 40. A local reference "AC" image 70, shown in FIG. 7, may be generated according to the '050 application by removing the low-pass-filtered version 50 of the reference-image average image column line from the reference-image average image column line 30, and a local test "AC" image 72, shown in FIG. 7, may be generated according to the '050 application by removing the low-pass-filtered version 60 of the test-image average image column line from the test-image average image column line 40. When the local reference AC image 70 and the local test AC image 72 are used for alignment purposes, for example, according to the methods and systems of the '050 application and other methods and systems, the large spikes 74, 75, 76, 77 at either side due to the abrupt image edges may tend to dominant the alignment, thereby producing incorrect alignment results.

Embodiments of the present invention comprise methods and systems for filtering large spikes from data signals, thereby improving applications such as the alignment application described above and other applications. These embodiments will be described in relation to the alignment application described above. However, a person having ordinary skill in the art will appreciate the application of embodiments of the present invention to other applications requiring spike and/or speckle-type noise filtering.

Figure 8:
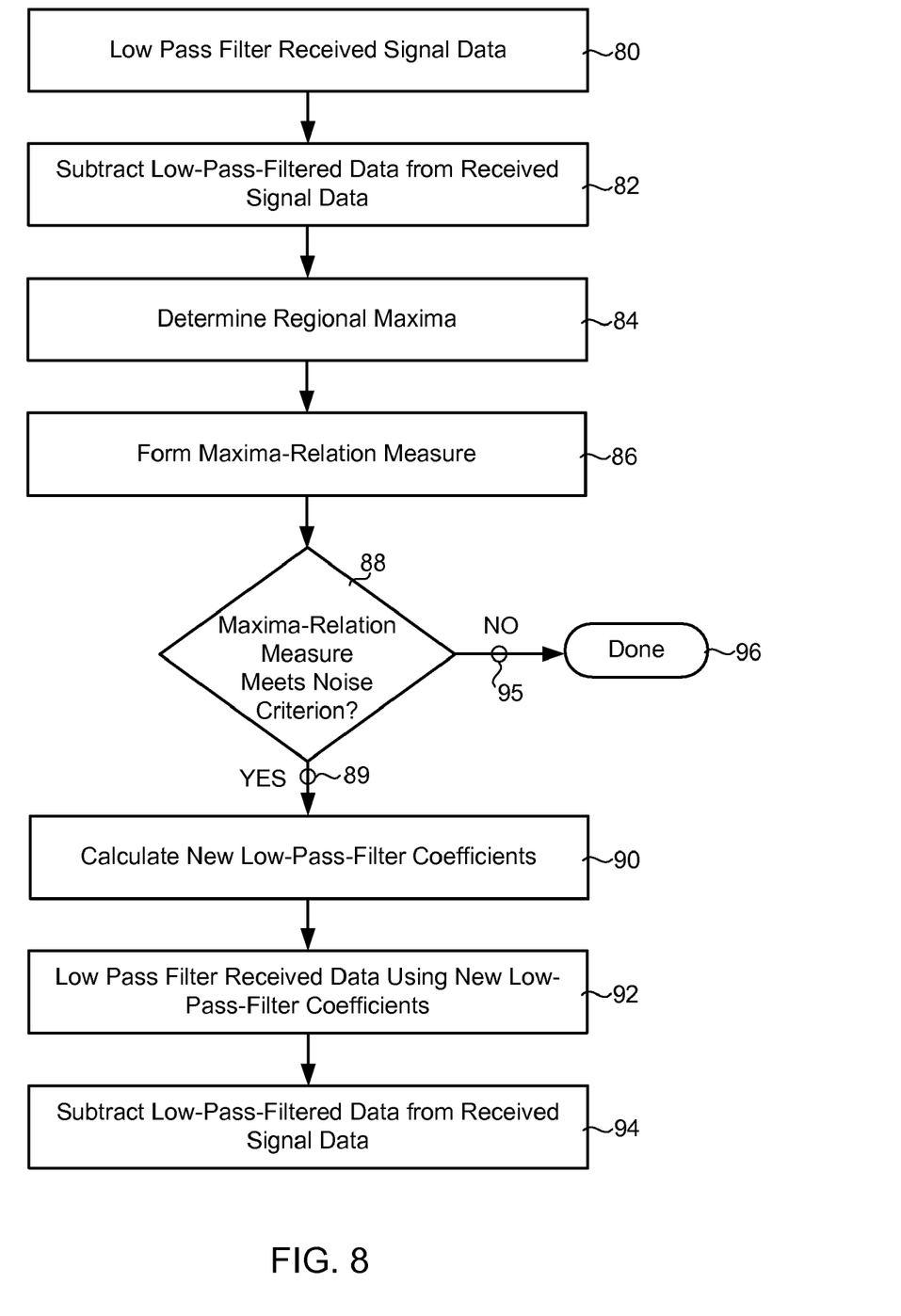
FIG. 8 is a chart showing exemplary embodiments of the present invention comprising determining low-pass-filter coefficients to pass an undesirable signal characteristic.

Some embodiments of the present invention may be described in relation to FIG. 8. In these embodiments, received signal data may be low pass filtered 80. The lowpass-filtered data may be subtracted 82 from the original, received signal data, thereby producing an AC signal. From the AC signal, a maximum signal value may be determined 84 for each of a plurality of regions of the AC signal. For the spatial alignment application described herein with respect to filtering of a reference signal or a test signal for spatial alignment, two regions may be defined: a side portion of data and an inner, also considered mid or middle, portion of data. The side portion of data may comprise the portion of data on the right and left sides of the signal and may be related to the search range as defined in the '050 application. In some embodiments, the search range may be 30 percent. The inner portion of data may comprise the portion of data not in the side portion of data. Generally, a regional maximum, for a region, which may be denoted Region$_i$, of a signal, which may be denoted ACsignal(k), may be determined according to:

MaxRegion$_i$=max|ACsignal(k)∋k ⊂ Region$_i$|, and, particularly, for a reference AC signal and a test AC signal as described above, inner and side portion maximums may be determined according to:

MaxMidRef=max|refACMid(c)| and
MaxMidTest=max|testACMid(c)| and

MaxSideRef=max|refACSide(c)| and
MaxSideTest=max|testACSide(c)|, respectively, where refACMid(c) may denote a value of a reference AC signal in the inner portion of the reference signal, refACSide(c) may denote a value of the reference AC signal in the side portion of the reference signal, testACMid(c) may denote a value of a test AC signal in the inner portion of the test signal, and testACSide(c) may denote a value of the test AC signal in the side portion of the test signal.

A maxima-relation measure may be determined 86 using the regional maximums. An exemplary maxima-relation measure may be the ratio of the maximum value of the side region to the maximum value of the middle region which may be determined according to:

$$MaxRelationRef = \frac{MaxSideRef}{MaxMidRef}$$

and $$MaxRelationTest = \frac{MaxSideTest}{MaxMidTest},$$

for the reference data and the test data, respectively.

The maxima-relation measure may be examined 88 to determine if it meets a noise criterion. In some embodiments of the present invention, the noise criterion may relate the ratio of the maximum value of the side region to the maximum value of the middle region to a threshold value. In some embodiments, the threshold value may be one. In alternative embodiments, the threshold value may be substantially near to one. In an exemplary embodiment, the noise criterion may be met if the ratio of the maximum value of the side region to the maximum value of the middle region is greater than one. In an alternative exemplary embodiment, the noise criterion may be met if the ratio of the maximum value of the side region to the maximum value of the middle region is considerably greater than one. If the noise criterion is not satisfied 95, the process may terminate 96. If the noise criterion is met 89, then new low-pass-filter coefficients may be determined 90.

Figure 9:
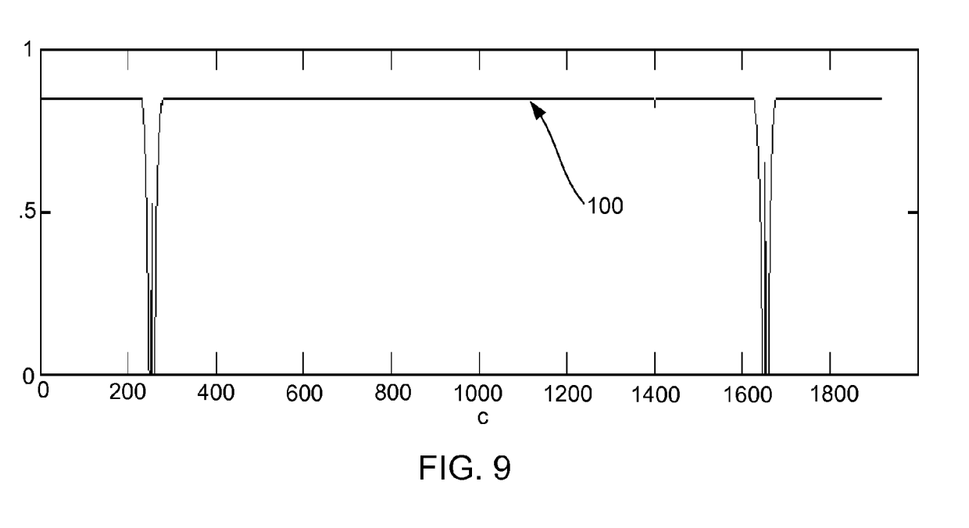
FIG. 9 is a plot of exemplary filter coefficients determined according to embodiments of the present invention.
Figure 10:
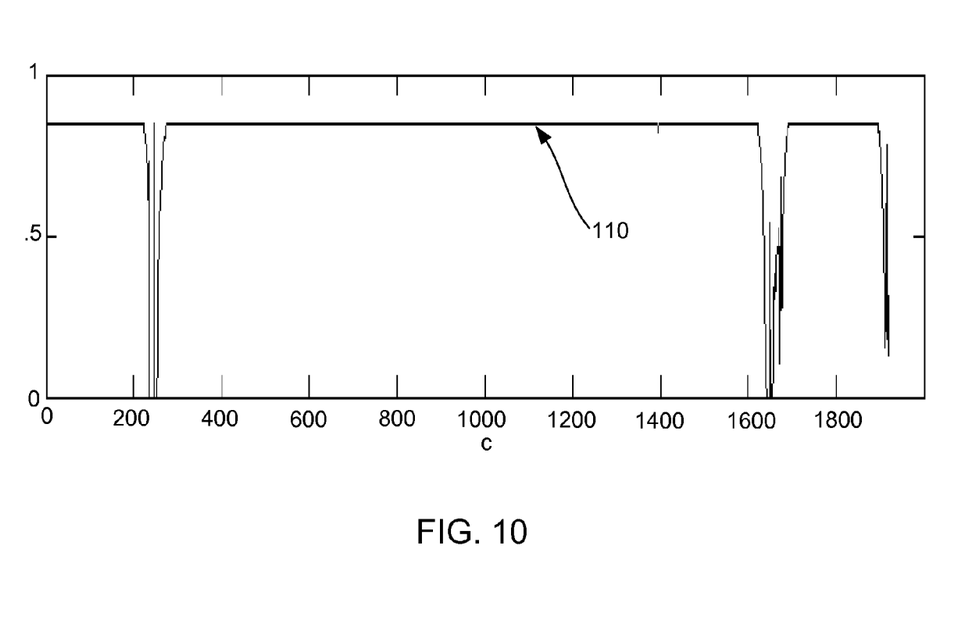
FIG. 10 is a plot of exemplary filter coefficients determined according to embodiments of the present invention.

In some embodiments of the present invention, the new low-pass-filter coefficients may be related to the coefficients of the original low pass filter. In these embodiments, the original filter coefficients may be modulated to have the original static coefficient value where the desired data signal is found and a value corresponding to an all-pass, also considered transparent, filter when a spike overwhelms the data signal. In alternative embodiments, the value may be near all-pass. For the spatial-alignment scenario, when a signal data point falls within a side portion at a location with absolute AC signal value which may be denoted AbsAC, then the original filter coefficient, which may be denoted oldCoeff, may be modified, in some embodiments, according to:

$$newCoeff = \text{clip}\left(\frac{maxSideAbsAC - \text{clip}(AbsAC - maxMidAbsAC)squelchSens}{maxSideAbsAC}\right)oldCoeff,$$

where $$squelchSens = \left(\frac{maxSideAbsAC - maxMidAbsAC}{maxMidAbsAC}\right)^{\frac{1}{4}}$$

and maxSideAbsAC may denote the maximum absolute value of an AC signal in the side portion of the AC signal, for example, maxSideRef for the reference AC signal and maxSideTest for the test AC signal, and maxMidAbsAC may denote the maximum absolute value of an AC signal in the inner portion of the AC signal, for example, maxMidRef for the reference AC signal and maxMidTest for the test AC signal. When the signal data point falls within the inner portion of the AC signal, then the filter coefficient may not be changed from the original filter coefficient value. FIG. 9 and FIG. 10 depict the IIR (infinite impulse response) low pass filter coefficients 100, 110, one coefficient value per reference line data sample, modulated according to how much the data is overwhelmed by the spike magnitude for the reference AC signal and the test AC signal, respectively, for the example shown in FIGS. 3-7.

The original, received data may be low pass filtered 92 using the new low-pass-filter coefficients. In some embodiments, the low pass filtering 92 may comprise a first filter pass in a first direction and a cascaded, second filter pass in the opposite direction. These filter passes may comprise an IIR low-pass filter of the form:

filteredSignal[c]=a$_1$[c]filteredSignal[c−1]+b$_0$[c]inputSignal[c], where filteredSignal denotes the filtered result (either in the forward or backward direction depending on the filter pass), inputSignal denotes the input signal (either in the forward or backward direction depending on the filter pass) and the filter coefficients may be given by:

b$_0$[c]=1−a1sq[c] and a$_1$[c]=a1sq[c], where $$a1sq[c] = \begin{cases} oldCoeff, & \text{when } c \text{ is in the inner portion of signal} \\ newCoeff, & \text{when } c \text{ is in the side portion of the signal,} \end{cases}$$

as described above.

The new low-pass-filtered data may be subtracted 94 from the original, received data, thereby producing a new AC signal wherein the dominate spike may be reduced without distorting the other data signal.

Figure 11:
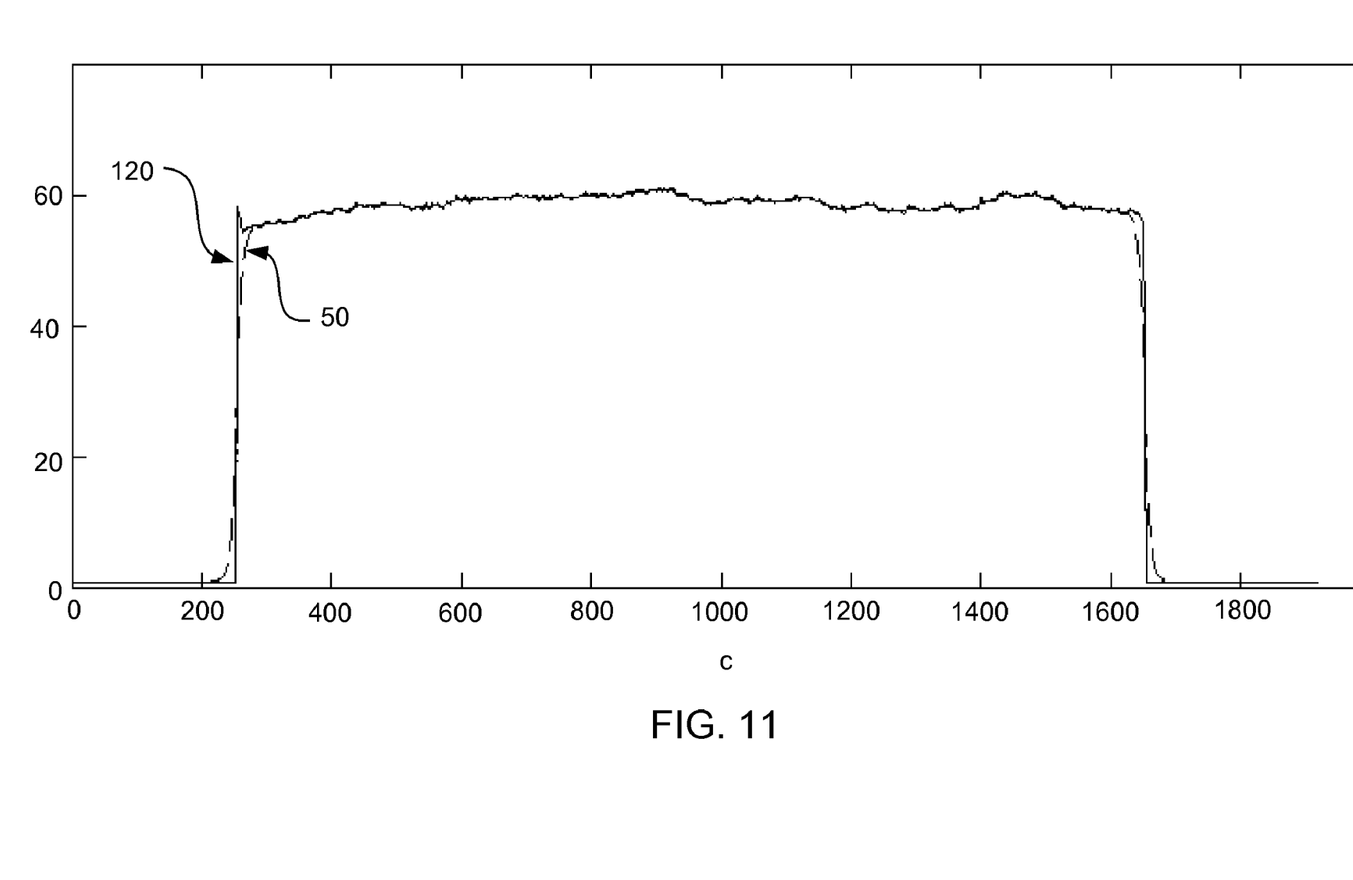
FIG. 11 is a plot of the exemplary average image column line shown in FIG. 3 and a low pass filtered version of the exemplary average image column line shown in FIG. 3 using low-pass-filter coefficients determined according to embodiments of the present invention.
Figure 12:
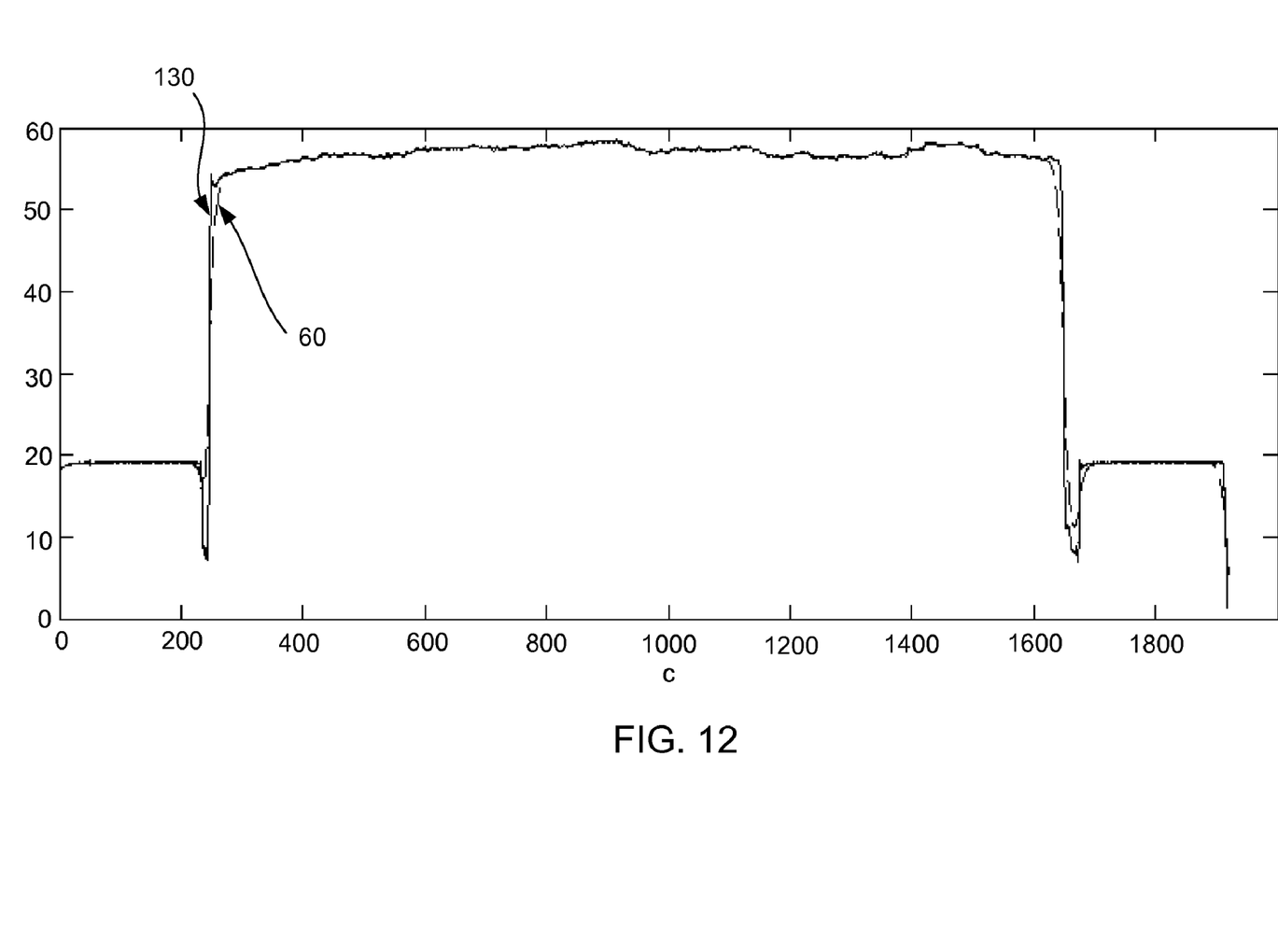
FIG. 12 is a plot of the exemplary average image column line shown in FIG. 4 and a low pass filtered version of the exemplary average image column line shown in FIG. 4 using low-pass-filter coefficients determined according to embodiments of the present invention.
Figure 13:
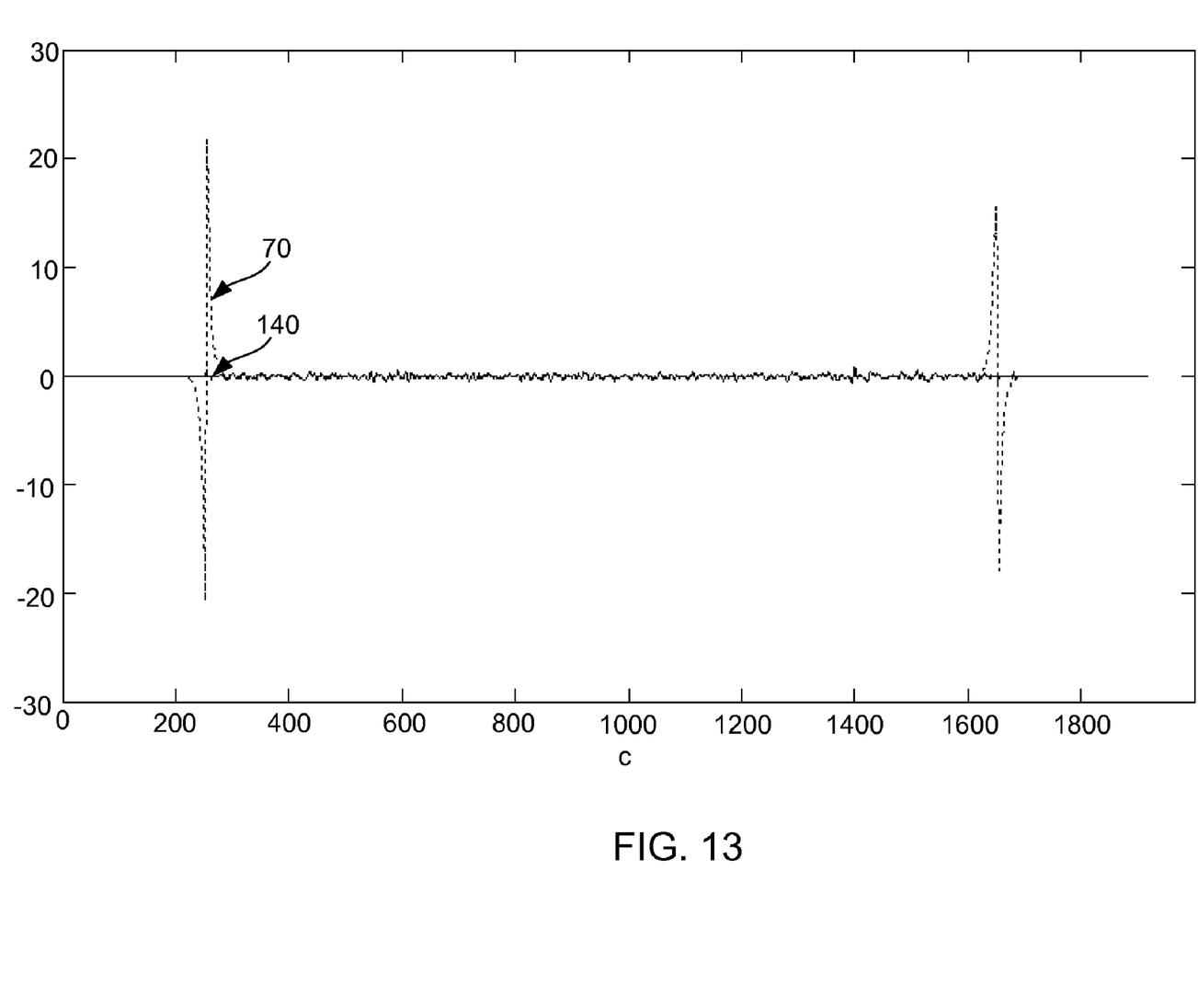
FIG. 13 is a plot showing the AC signal associated with the exemplary reference average image column line shown in FIG. 3 and the AC signal determined according to embodiments of the present invention.
Figure 14:
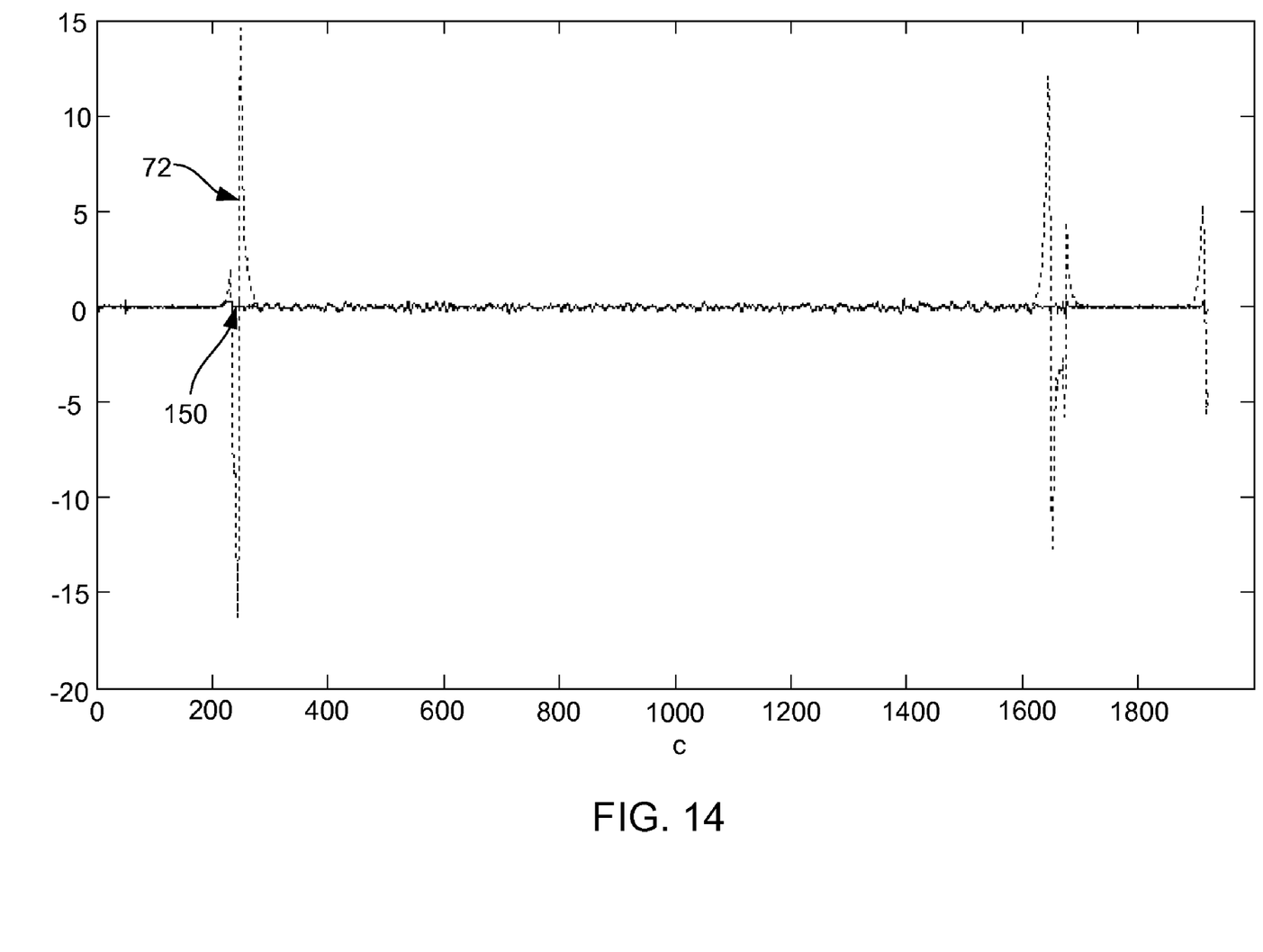
FIG. 14 is a plot showing the AC signal associated with the exemplary test average image column line shown in FIG. 4 and the AC signal determined according to embodiments of the present invention.
Figure 15:
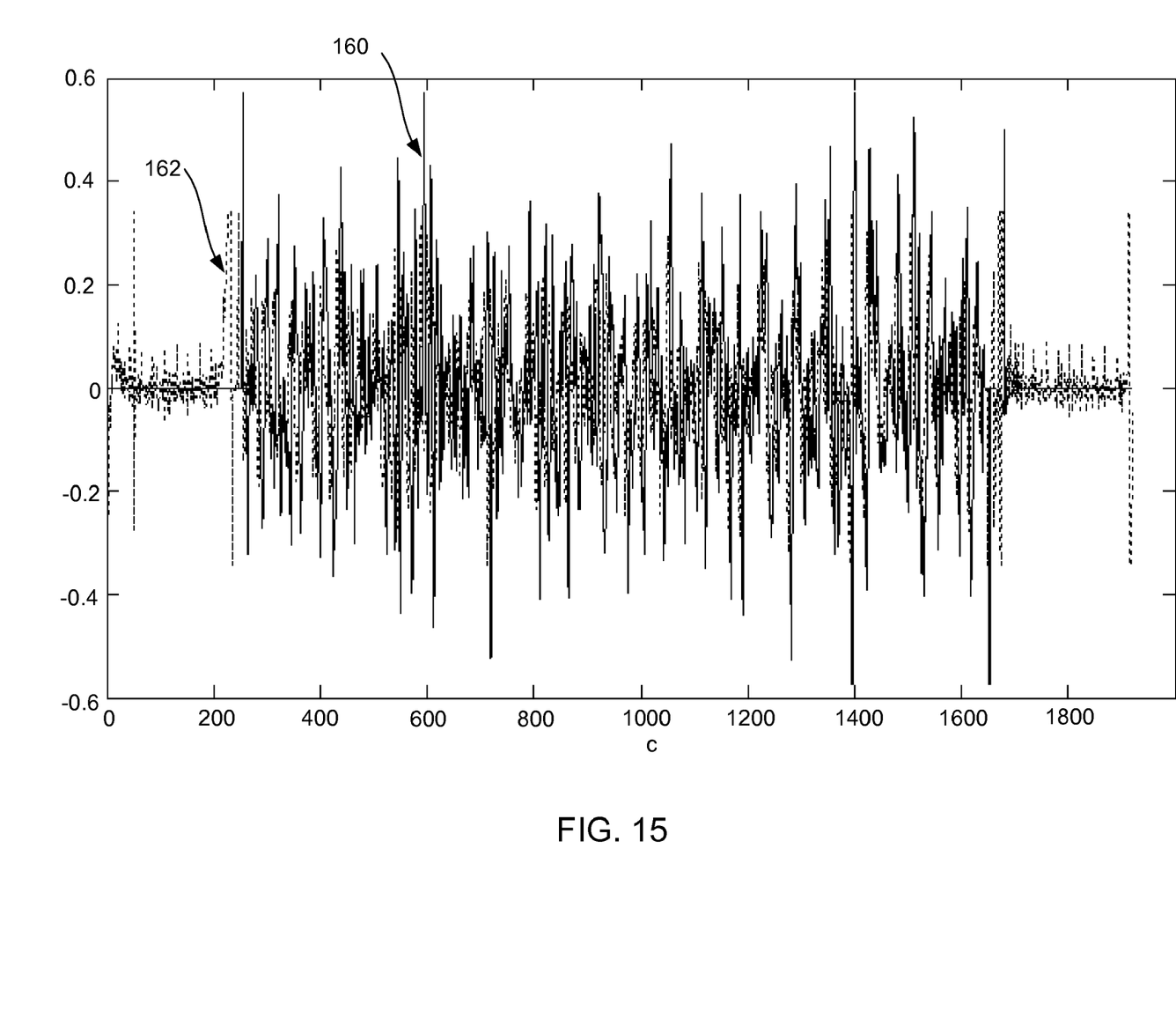
FIG. 15 is a plot showing the AC reference and AC test signals determined according to embodiments of the present invention.

FIG. 11 depicts the originally filtered 50 reference signal and the filtered reference signal 120 using the new filter coefficients. The filtered signal 120 using the new filter coefficients tracks the original signal in the region near to the abrupt edge better than the filtered signal 50 using the original filter coefficients. FIG. 12 depicts the originally filtered 60 test signal and the filtered test signal 130 using the new filter coefficients. The filtered signal 130 using the new filter coefficients tracks the original signal in the region near to the abrupt edge better than the filtered signal 60 using the original filter coefficients. FIG. 13 depicts the original AC reference signal 70 and the new AC reference signal 140 generated using new filter coefficients. The spikes associated with the abrupt image edges are not present in the new AC reference signal 140. FIG. 14 depicts the original AC test signal 72 and the new AC test signal 150 generated using new filter coefficients. The spikes associated with the abrupt image edges are not present in the new AC test signal 150. FIG. 15 shows resulting reference (solid) 160 and test (dashed) 162 AC signals which may be used for alignment. Since the spikes have been suppressed, the measure of alignment may be based on matching of the pertinent signal data and not overwhelmed by dominant spikes.

In some embodiments of the present invention, the new AC signal resulting from filtering with spike-suppression coefficients, may be clipped to a maximum value. In some of these embodiments, the maximum value may be the maximum value of the side portion of the original AC signal.

In alternative embodiments of the present invention, if the new AC signal comprises values greater than the maximum value of the side portion of the original AC signal, then these values may be suppressed using the same processed.

Figure 16:
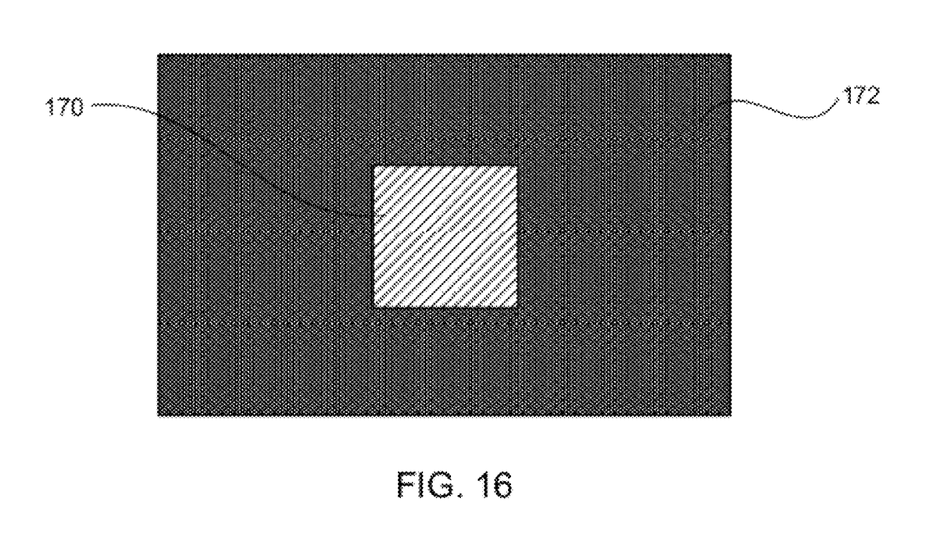
FIG. 16 is a picture depicting an exemplary inner region and an exemplary side region for a two-dimensional signal.

In some embodiments of the present invention described in relation to FIG. 16, the inner portion 170 and side portion 172 of a signal may be two dimensional. In these embodiments, the inner signal portion 170 may comprise a region immediately surrounding the spike and the side signal portion 172 may comprise a region immediately surrounding the inner signal portion 170. In an exemplary embodiment, as depicted in FIG. 16, these regions may be based on rectangles. In alternative embodiments, the regions may be based on other shapes.

Some embodiments of the present invention comprise methods and systems for aligning a reference image and a test image. In some embodiments of the present invention, both a reference image and a test image may be filtered according to embodiments of the present invention to suppress a spike and/or speckle-type noise. An input reference signal may be filtered according to a first reference low pass filter. In some embodiments, the input reference signal may comprise an average reference-image column line signal formed by averaging the values in each column. The low-pass-filtered reference signal, also considered the local-mean reference signal, may be subtracted from the input reference signal, thereby producing a first AC reference signal. A maximum of a first region associated with the first AC reference signal and a maximum of a second region associated with the first AC reference signal may be determined. The first region may be associated with an undesirable signal characteristic. When the maximum of the first region and the maximum of the second region meet a reference comparison criterion, coefficients for a second reference low pass filter may be determined. The coefficients may be determined such that the second reference low pass filter may pass, with minimal attenuation, the undesirable signal characteristic. The input reference signal may be filtered according to the second reference low pass filter, thereby producing a second local-mean reference signal, and a second AC reference signal may be produced by subtracting, from the input reference signal, the second local-mean reference signal. An input test signal may be filtered according to a first test low pass filter. In some embodiments, the input test signal may comprise an average test-image column line signal formed by averaging the values in each column. The low-pass-filtered test signal, also considered the local-mean test signal, may be subtracted from the input test signal, thereby producing a first AC test signal. A maximum of a first region associated with the first AC test signal and a maximum of a second region associated with the first AC test signal may be determined. The first region may be associated with an undesirable signal characteristic. When the maximum of the first region and the maximum of the second region meet a test comparison criterion, coefficients for a second test low pass filter may be determined. The coefficients may be determined such that the second test low pass filter may pass, with minimal attenuation, the undesirable signal characteristic. The input test signal may be filtered according to the second test low pass filter, thereby producing a second local-mean test signal, and a second AC test signal may be produced by subtracting, from the input test signal, the second local-mean test signal. Alignment may be performed between the first AC reference signal and the first AC test signal when the test comparison criterion is not met and the reference comparison criterion is not met. Alignment may be performed between the first AC reference signal and the second AC test signal when the test comparison criterion is met and the reference comparison criterion is not met. Alignment may be performed between the second AC reference signal and the first AC test signal when the test comparison criterion is not met and the reference comparison criterion is met. Alignment may be performed between the second AC reference signal and the second AC test signal when the test comparison criterion is met and the reference comparison criterion is met.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for filtering a signal, said method comprising:
   a) low pass filtering a first signal according to a first low pass filter, thereby producing a second signal;
   b) subtracting the second signal from the first signal, thereby producing a third signal;
   c) determining a first maximum of the third signal within a first region of the third signal, wherein the first region contains an undesired signal characteristic;
   d) determining a second maximum of the third signal within a second region of the third signal; and
   e) when the first maximum and the second maximum meet a first criterion,
      i) determining a second low pass filter;
      ii) low pass filtering the first signal according to the second low pass filter, thereby producing a fourth signal; and
      iii) subtracting the fourth signal from the first signal, thereby producing a filtered signal.

2. A method as described in claim 1 further comprising:
   a) forming a ratio of the first maximum and the second maximum; and
   b) wherein the first criterion is met when the ratio is greater than a first threshold.

3. A method as described in claim 1 further comprising clipping the filtered signal at a limit value based on the first maximum.

4. A method as described in claim 1, wherein the determining a second low pass filter comprises selecting a first plurality of filter coefficients, wherein the first plurality of filter coefficients effectuate minimal attenuation of the undesirable signal characteristic.

5. A method as described in claim 1, wherein the determining a second low pass filter comprises selecting a first plurality of filter coefficients, wherein the first plurality of filter coefficients effectuate no attenuation of the undesirable signal characteristic.

6. A method as described in claim 1, wherein the first signal is a signal selected from the group consisting of a reference signal and a test signal.

7. A method as described in claim 1, wherein the first signal comprises a one- dimensional summary signal of a two-dimension signal.

8. A method as described in claim 7, wherein:
   a) the first region comprises the side portions of the third signal; and
   b) the second region comprises the middle portion of the third signal.

9. A system for filtering a signal, said system comprising:
   a) a first low pass filter for filtering a first signal, thereby producing a second signal;
   b) a first subtractor for subtracting the second signal from the first signal, thereby producing a third signal;
   c) a first-region maximum determiner for determining a first maximum of the third signal within a first region of the third signal, wherein the first region contains an undesired signal characteristic;
   d) a second-region maximum determiner for determining a second maximum of the third signal within a second region of the third signal;
   e) a comparator for comparing the first maximum and the second maximum;
   f) a low-pass-filter coefficient determiner for determining a plurality of filter coefficients when the comparator provides a result indicating the first maximum and the second maximum meet a first criterion;
   g) a second low pass filter, comprising the plurality of filter coefficients, for filtering the first signal when the comparator provides the result indicating the first maximum and the second maximum meet the first criterion, thereby producing a fourth signal; and
   h) a second subtractor for subtracting the fourth signal from the first signal when the comparator provides the result indicating the first maximum and the second maximum meet the first criterion, thereby producing a filtered signal.

10. A system as described in claim 9 further comprising: a) a ratio calculator for forming a ratio of the first maximum and the second maximum; and b) wherein the first criterion is met when the ratio is greater than a first threshold.

11. A system as described in claim 9, wherein the low-pass-filter coefficient determiner comprises selecting the first plurality of filter coefficients to effectuate minimal attenuation of the undesirable signal characteristic.

12. A system as described in claim 9, wherein the low-pass-filter coefficient determiner comprises selecting the first plurality of filter coefficients to effectuate no attenuation of the undesirable signal characteristic.

13. A system as described in claim 9 further comprising a limiter for clipping the filtered signal at a limit value based on the first maximum.

14. A method for aligning a reference image and a test image, said method comprising:
   a) forming a reference summary signal based on the reference image;
   b) low pass filtering the reference summary signal according to a first reference low pass filter, thereby producing a first local-mean reference signal;
   c) subtracting the first local-mean reference signal from the reference summary signal, thereby producing a first Alternating Current (AC) reference signal;
   d) determining a first reference maximum of the first AC reference signal within a first reference region of the first AC reference signal, wherein the first reference region contains an undesired signal characteristic;
   e) determining a second reference maximum of the first AC reference signal within a second reference region of the first AC reference signal;
   f) when the first reference maximum and the second reference maximum meet a reference criterion,
      i) determining a second reference low pass filter;
      ii) low pass filtering the reference summary signal according to the second reference low pass filter, thereby producing a second local-mean reference signal; and
      iii) subtracting the second local-mean reference signal from the reference summary signal, thereby producing a second AC reference signal;
   g) forming a test summary signal based on the test image;
   h) low pass filtering the test summary signal according to a first test low pass filter, thereby producing a first local-mean test signal;
   i) subtracting the first local-mean test signal from the test summary signal, thereby producing a first AC test signal;
   j) determining a first test maximum of the first AC reference signal within a first test region of the first AC test signal, wherein the first test region contains the undesired signal characteristic;
   k) determining a second test maximum of the first AC reference signal within a second test region of the first AC test signal;
   l) when the first test maximum and the second test maximum meet a test criterion,
      i) determining a second test low pass filter;
      ii) low pass filtering the test summary signal according to the second test low pass filter, thereby producing a second local-mean test signal; and
   m) subtracting the second local-mean test signal from the test summary signal, thereby producing a second AC test signal; and
      i) aligning the reference image the test image using the second AC reference signal and the second AC test signal when the reference criterion and the test criterion are met;
      ii) aligning the reference image the test image using the second AC reference signal and the first AC test signal when the reference criterion is met and the test criterion is not met;
      iii) aligning the reference image the test image using the first AC reference signal and the first AC test signal when the reference criterion is not met and the test criterion is not met; and iv) aligning the reference image the test image using the first AC reference signal and the second AC test signal when the reference criterion is not met and the test criterion is met.

15. A method as described in claim 14, wherein:
a) the first reference region comprises the side portions of the first AC reference signal;
b) the second reference region comprises the middle portion of the first AC reference signal;
c) the first test region comprises the side portions of the first AC test signal; and
d) the second test region comprises the middle portion of the first AC test signal.

16. A method as described in claim 14, wherein the determining a second reference low pass filter comprises selecting a first plurality of reference filter coefficients to effectuate minimal attenuation of the undesirable signal characteristic.

17. A method as described in claim 14, wherein the determining a second test low pass filter comprises selecting a first plurality of test filter coefficients to effectuate minimal attenuation of the undesirable signal characteristic.

18. A method as described in claim 14, wherein the determining a second reference low pass filter comprises selecting a first plurality of reference filter coefficients to effectuate no attenuation of the undesirable signal characteristic.

19. A method as described in claim 14, wherein the determining a second test low pass filter comprises selecting a first plurality of test filter coefficients to effectuate no attenuation of the undesirable signal characteristic.

20. A method as described in claim 14 further comprising clipping the second AC reference signal.

21. A method as described in claim 14 further comprising clipping the second AC test signal.

* * * * *